(12) United States Patent
Yamauchi et al.

(10) Patent No.: US 7,745,035 B2
(45) Date of Patent: Jun. 29, 2010

(54) SEPARATOR AND FUEL CELL USING THEREOF

(75) Inventors: Hiroshi Yamauchi, Hitachi (JP); Kenji Yamaga, Hitachi (JP); Ko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/276,527

(22) Filed: Nov. 24, 2008

(65) Prior Publication Data

US 2009/0081524 A1 Mar. 26, 2009

Related U.S. Application Data

(62) Division of application No. 11/068,985, filed on Mar. 2, 2005, now abandoned.

(30) Foreign Application Priority Data

Apr. 2, 2004 (JP) ............... 2004-110050

(51) Int. Cl.
*H01M 8/02* (2006.01)
(52) U.S. Cl. ............... 429/34; 429/38; 429/39
(58) Field of Classification Search ....... 429/34–39
See application file for complete search history.

(56) References Cited

U.S. PATENT DOCUMENTS

| | | | | |
|---|---|---|---|---|
| 4,522,895 A | * | 6/1985 | Shigeta et al. | 429/44 |
| 5,108,849 A | * | 4/1992 | Watkins et al. | 429/30 |
| 6,207,309 B1 | * | 3/2001 | Bonville et al. | 429/26 |
| 6,689,504 B1 | | 2/2004 | Matsumoto et al. | |
| 6,884,535 B2 | | 4/2005 | Saito et al. | |
| 7,144,648 B2 | | 12/2006 | Tawfik | |
| 2002/0132152 A1 | | 9/2002 | Saito et al. | |
| 2004/0142226 A1 | | 7/2004 | Yamauchi et al. | |

FOREIGN PATENT DOCUMENTS

| | | | |
|---|---|---|---|
| JP | 04267062 A | * | 9/1992 |
| JP | 05 109415 | | 4/1993 |
| JP | 07263003 | | 10/1995 |
| JP | 10055811 | | 2/1998 |
| JP | 10241709 | | 9/1998 |
| JP | 11 126622 | | 5/1999 |
| JP | 2000-123850 | | 4/2000 |
| JP | 2000-294257 | | 10/2000 |
| JP | 2001-283880 | | 10/2001 |
| JP | 2003 109618 | | 4/2003 |
| JP | 2003-123801 | | 4/2003 |
| JP | 2003-173791 | | 6/2003 |

* cited by examiner

*Primary Examiner*—Gregg Cantelmo
(74) *Attorney, Agent, or Firm*—Antonelli, Terry, Stout & Kraus, LLP.

(57) ABSTRACT

A separator for a fuel cell, comprising a planar panel formed therein with a plurality of manifolds for passing reactive fluid or cooling medium through adjacent cell, and a pair of conductive passage boards superposed with one another, interposing therebetween the planar panel, the passage boards being formed therein with a plurality of meandering through channels for distributing the reactive fluid or the cooling medium from the manifolds, wherein the planar panel being formed therein with slits through which channel defining walls of the meandering through channels of the fluid passages are electrically connected with each other.

8 Claims, 11 Drawing Sheets

SEPARATOR AND FUEL CELL USING THEREOF

CROSS-REFERENCE TO RELATED APPLICATION

This application is a divisional application of U.S. application Ser. No. 11/068,985, filed Mar. 2, 2005, now abandoned. The contents of which are incorporated herein by reference.

BACKGROUND OF THE INVENTION

The present invention relates to a separator which is one of components in a fuel cell, and also relates to a fuel cell using thereof.

There have been several kinds of fuel cells which are sorted in view of kinds of electrolytes used therein. For example, a phosphate acid fuel cell (PAFC) has a carrier impregnated therein with phosphate, and is adapted to be operated at a temperature in a range from 150 to 220 deg. C. A molten carbonate fuel cell (MCFC) includes a molded electrolyte carrier made of a mixture of lithium carbonate and potassium carbonate, and is adapted to be operated at a temperature in a range from 600 to 700 deg. C. Further, a solid oxide fuel cell uses, as electrolyte, stabilized zirconium having oxygen ion conductivity, and is adapted to be operated at a temperature from 700 to 1,000 deg. C. Any of the above-mentioned fuel cells utilizes hydrogen, reformed gas, hydrocarbon or the like as a fuel, and air or the like as oxidizer gas.

Among several kinds of fuel cells, a proten exchange membrane fuel cell (PEMFC) or a direct methanol fuel cell (DMFC) mainly has such a feature that a membrane-like solid electrolyte made of polymer is jointed thereto at its opposite surfaces with carbon electrodes carrying catalyst such as platinum. This will be referred to a membrane electrode assembly (an electrolytic membrane/electrode integral structure) which is abbreviated to "MEA". The solid polymer electrolyte fuel cell has such a configuration that the MEA is interposed between a pair of panels called as separators and formed therein with passages for fuel gas (containing hydrogen) and oxidizer gas (oxygen or air).

It is noted that the fluid such as gas as fuel and the fluid such as gas as an oxidizer will be inclusively referred to as reaction gas or reaction fluid. In general, a porous carbon sheet is interposed between the MEA and the separator. This constitutes a gas diffusion layer which can enhance such a function that the reaction gas is efficiently and uniformly fed to electrodes. The above-mentioned components are bundled into a set which is called as a unit cell, and a fuel cell stack is composed of a plurality of unit cells stacked one upon another. The separator has such a roll that the reaction gas is efficiently fed to electrodes, and therefore, when the reaction gas is fed to a fuel cell while an suitable load is applied, an electric power can be produced. In association, heat such as heat of reaction and Joule's heat is also generated. In order to remove the heat, the fuel cell incorporates, in general, a separator for feeding cooling water which passes through a part of the above-mentioned separator.

A separator also has a roll of transferring electric power between adjacent cells with less energy loss, and accordingly, it is, in general, made of carbon group conductive materials and is formed therein with passage channels for ventilating reaction gas and passing cooling medium. It has been considered that a metal sheet or the like is used as a material of the separator as a separator material, in addition to the carbon group material. Since a metal has a low material cost, and can be simply fabricated by stamping, and since a thin sheet metal can be used, it can offer such a merit that the separator can be compact and lightweight, and such a feature that the costs thereof are reduced.

However, in the case of a separator made of metal, should a thin sheet metal be formed therein with passage channels by pressing, it would be difficult to obtain fluid passages having desired depths and widths due to a limitation of workability caused by a process limit to a metal material. Thus, there would be caused such hindrances as non-uniformity of reaction gas streams, and less area of contact with an electrode. As a result, there would be caused such a problem that a desired power generating performance cannot be obtained. Even though a desired channel can be formed, the separator after fabrication would be warped or deformed, or could not have a required degree of finishing accuracy, resulting in leakage of reaction gas or increase in contact resistance.

As another disadvantage caused by the press-formed metal separator, apex tops of channels after fabrication have curvatures, and accordingly, an area of contact with the gas diffusion layer or the like becomes less. As a result, there would be caused such a problem that the resistance is increased.

In the case of making conventional metal separators in contact with one another, there would be caused such a problem that their contact area cannot be obtained sufficiently. That is, since the apices of channels for passage of reaction gas, which are defined by spaces between two separators mated with one another, are not flat, the separators are made into line or point contact with one another, and accordingly, the resistance of contact becomes higher, resulting in difficulty in obtaining a satisfactory performance of power generation. In order to eliminate the above-mentioned problem, JP-A-2003-173791 discloses such a configuration that parts of apices having curvatures are removed so as to be flattened. Further, JP-A-2003-123801 discloses such a configuration that a conductive sheet gasket is interposed between contact surfaces of separators in order to prevent occurrence of voltage drop caused by a resistance of contact at surfaces of cooling water between the separators.

As one of conventional inventions which can effectively solve the above-mentioned problems, there is a separator as disclosed in JP-A-2000-123850 or JP-A-2000-294257. This separator is composed of a metal thin sheet and a carbon paper which is cut so as to form passages in order to serve as a gas passage member. Thus, a single separator can be obtained without press-forming, and accordingly, it can reduce the costs. Further, since the passage part is formed by cutting the carbon paper, the degree of finishing accuracy is high, and further, it has a flat surface making contact with a gas diffusion layer, thereby it is possible to eliminate the above-mentioned problems.

The separator composed of the thin metal sheet and the carbon paper which is cut so as to form passages in order to serve as the gas passage member, as disclosed in JP-A-2000-123850 or JP-A-2003-123801 have several advantages. However, the carbon paper forming the passage part is split into several members, the larger the number of passages, the larger the number of subdivided passage members. As a result, there have been such problems that the number of components constituting a cell is increased, and that the number of manufacturing steps is increased since the components are fastened to one another by conductive materials. Further, in the inventions stated in the above-mentioned patent documents, no countermeasures are considered against corrosion on the metal side which is caused at contact surfaces of the metal separator and the passage part. Thus, there would be caused increase in contact resistance caused by corrosion on the metal side, contamination to electrodes and electrolytic membranes caused by corrosion products, and the like, resulting in deterioration of the fuel cell.

BRIEF SUMMARY OF THE INVENTION

A first object of the present invention is to provide a separator for a fuel cell, comprising a planar panel, conductive passage boards which are joined to each other and between which the planer panel is held, the planar panel being formed therein with a plurality of manifolds while the passage boards are formed therein with a plurality of meandering through-channels a part of which is superposed with a part or all parts of the above-mentioned manifolds.

Further, a second object of the present invention is to provide a fuel cell using the above-mentioned separator.

The separator according to the present invention is the so-called stack type separator composed of a planar panel such as a planar metal panel, and a pair of conductive passage boards which are stacked one upon another.

According to the present invention, there is provided a separator which can be easily fabricated and assembled with a lower internal voltage drop and less performance deterioration, and there is provided a fuel cell using this separator. Further, since the above-mentioned components can be simply prepared by mere drilling, and are planar as they are, a contact area therebetween and a contact area thereof with another component can be larger.

There may be provided a covering layer for preventing corrosion of the planar metal panel and restraining growth of a film over the entire surface of the planar metal panel or at least a part thereof which makes contact with the meandering through-channels.

According to the present invention, there is provided a separator for a fuel cell, comprising a planar metal panel, passage boards made of porous conductive materials, which are superposed with the planar metal panel, the planar metal panel being formed therein with a plurality of manifolds for passing reactive fluid or cooling medium through adjacent cells while the passage boards are formed therein with a plurality of meandering through-channels for passing therethrough the reactive fluid or the cooling medium from the manifold, wherein a part of the meandering through-channels is superposed with a part or all parts of the manifolds.

In the above-mentioned separator, a gasket may be arranged so as to surround the passage boards. Further, a covering layer for preventing corrosion of the planar metal panel, or restraining growth of a nonconductive film may be provided over the entire surface of the outer surface of the planar metal panel or at least part thereof which make contact with the meandering through-channels.

Further, according to the present invention, there is provided a separator for a fuel cell, comprising a planar panel formed therein with a plurality of manifolds for passing reactive fluid or cooling medium through a cell adjacent to the separator, and a pair of passage boards superposed with each other and interposing therebetween the planar panel, the passage boards being formed therein with a plurality of meandering through-channels for distributing the reactive fluid or the cooling medium from the manifolds, and a slit being formed in a part of the planar panel where the pair of passage boards are superposed with each other when the passage boards which make contact with opposite surfaces of the planar panel are projected.

As sated above, in the case of the planar panel which is made of metal, a covering layer for preventing the planar metal panel from being corroded or for restraining a growth of a nonconductive film, may be provided over each of the entire surface of the planar panel, or over at least a part thereof which makes contact with the meandering through-channels.

Further, the passage boards may be made of conductive porous materials.

In the above-mentioned separator, it is desirable that the metal planar panel is formed thereon with an outermost layer made of a material selected from a group consisting of stainless steel, nickel, nickel base alloy, titanium, titanium base alloy, niobium, niobium base alloy, tantalum, tantalum base alloy, tungsten, tungsten base alloy, zirconium, zirconium base alloy aluminum and aluminum base alloy.

The above-mentioned covering layer is composed of a resin binder made of a material selected from a group consisting of fluororesin, phenolic resin, epoxy resin, styrenic resin, butadiene resin, polycarbonate resin, polyphenylenesulphido resin, a mixture thereof or a copolymer thereof, and a conductive material containing not less than one kind of carbon. By integrally incorporating the passage board and the covering layer with each other, the handling ability of the separator can be enhanced.

Further, according to the present invention, there is provided a fuel cell comprising a fuel cell stack which comprises a plurality of power generating units each composed of an integrated membrane electrode structure, a pair of gas diffusion layers mated with opposite surfaces of the integral membrane electrode structure, a pair of separators arranged outside the gas diffusion layers, and each having a metal planar panel, conductive passage boards superposed with each other and interposing therebetween the metal planar panel, the metal planar panel being formed therein with a plurality of manifolds for passing reactive fluid or cooling medium through an adjacent cell, and the passage boards being formed therein with a plurality of meandering through-channels for distributing the reactive fluid or cooling medium from the manifolds, a part of the meandering through-channels being arranged so as to be superposed with a part of or all parts of the manifolds, power collector panels arrange outside of the fuel cell stack, and end plates arranged further outside thereof.

In this fuel cell, it is desirable that those of the above-mentioned passage boards which are arranged every other power unit, are for cooling water.

It is noted that the present invention should not be specifically limited to the above-mentioned fuel cell including the above-mentioned separators, but can involve various modifications thereof.

According to one aspect of the present invention, with the combination of the planar metal panel provided with the covering layers for prevention of corrosion, and the conductive passage boards, it is possible to provide a separator which has low costs and a long use life. Further, a single separator can be composed of a passage board which is conductive and which is formed therein a plurality of punched-out meandering channels for distributing reactive gas, and a planar covered metal panel. With this configuration, by superposing a part of the passage board with the manifolds of the covered metal panel, a separator having meandering passage channels can be constituted of at least a single passage board and a single metal panel.

Thus, since the separator can be formed merely by punching process steps, it is possible to reduce the costs, and to ensure a sufficient contact area. Further, with the results of various tests as to the use life of the separator, it has been found that corrosion of metal is remarkable in a part where a current runs through, and accordingly, the covering layers for restraining corrosion of the metal panel or the like are formed on the surfaces of the metal panel. With this configuration, it is possible to greatly prolong the use lift of the separator.

Further, the covered metal is formed therein with a slit which allows the passage boards which are located on opposite sides of the cover metal panel, to make electrical contact with one another while no metal is present in the running path of a current. Thus, it is possible to eliminate such a serious problem that the contact resistance is increased due to the growth of a nonconductive film and corrosion which are caused in use of metal as a material of the separator (Embodiment 1). Further, since no adhesion is required, the manufacturing process can be simplified. In the separator formed of a metal planar panel and conductive passage boards, the metal planar panel is formed therein with a plurality of manifolds for passing reactive fluid or cooling medium through an adjacent cell.

The passage boards are formed therein with a plurality of meandering through-channels for distributing the active fluid or cooling medium from the manifold, and are arranged so that a part of the meandering through-channels is superposed with a part or all parts of the manifolds. Further, the surfaces of the metal planar panel are formed thereon with covering layers for restraining corrosion or a growth of a nonconductive film, in its entirety or over at least a part thereof which makes contact with the meandering through channels.

Other objects, features and advantages of the invention will become apparent from the following description of the embodiments of the invention taken in conjunction with the accompanying drawings.

BRIEF SUMMARY OF THE SEVERAL VIEWS OF THE DRAWING

FIG. 9A is an enlarged sectional view illustrating a part of the separator surrounded by a chain line c;

DETAILED DESCRIPTION OF THE INVENTION

Embodiment 1

Figure 1:
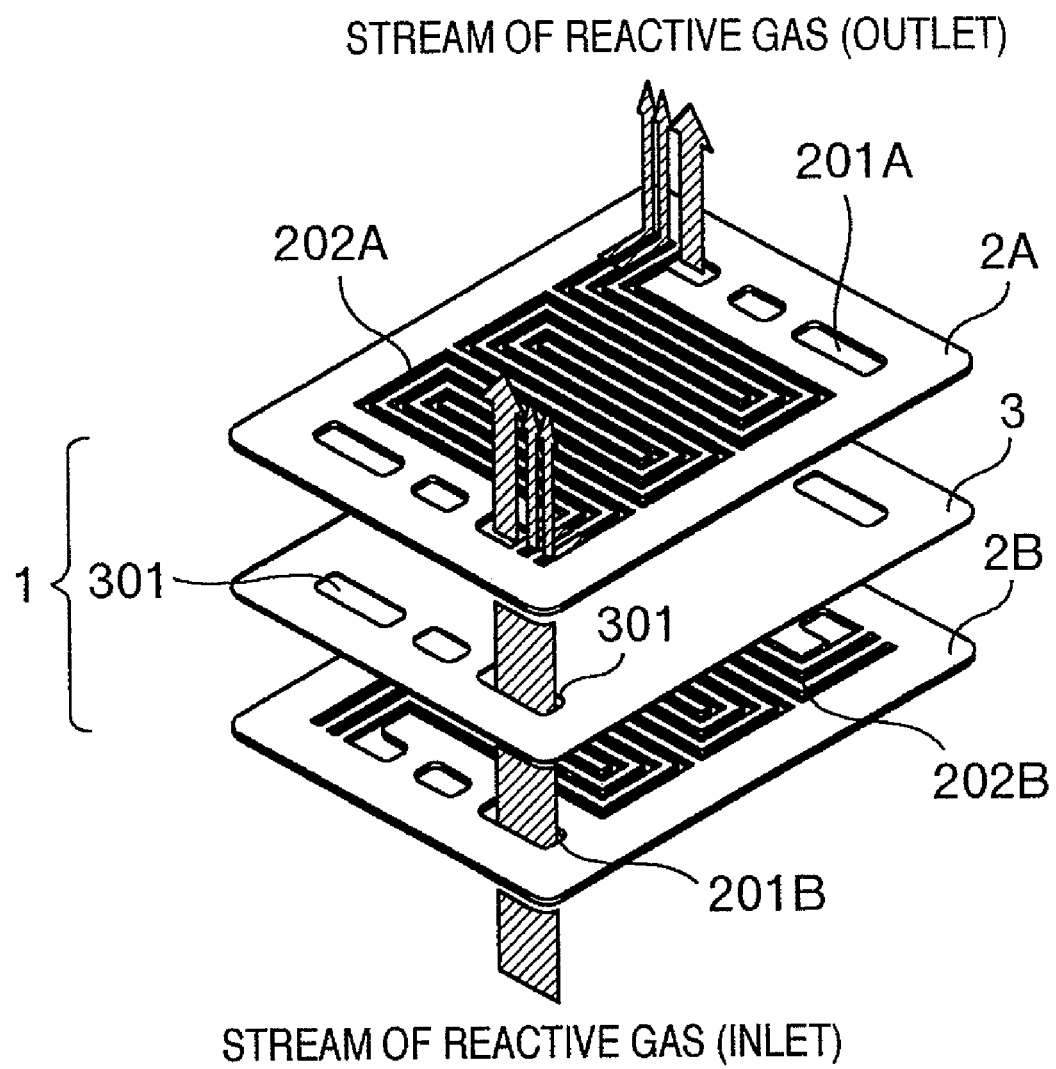
FIG. 1 is an exploded perspective view illustrating a basic configuration of an embodiment 1 of a separator according to the present invention.

Explanation will be made of a power generation cell in an embodiment 1 of the present invention with reference to the drawings. Referring to FIG. 1 which shows a basic configuration of a separator according to the present invention, the single separator 1 is composed of covered metal panel 3 formed therein with manifolds 301, and passage boards 2A, 2B superposed over opposite surfaces of the covered metal panel 3 and formed therein with meandering through-channels for distributing reactive gas and cooling medium from the manifolds 301. The passage boards 2A, 2B are formed therein with meandering channels 202 which pierce therethrough and are also formed therein with a plurality of manifolds 201A, 201B as required.

Figure 2A:
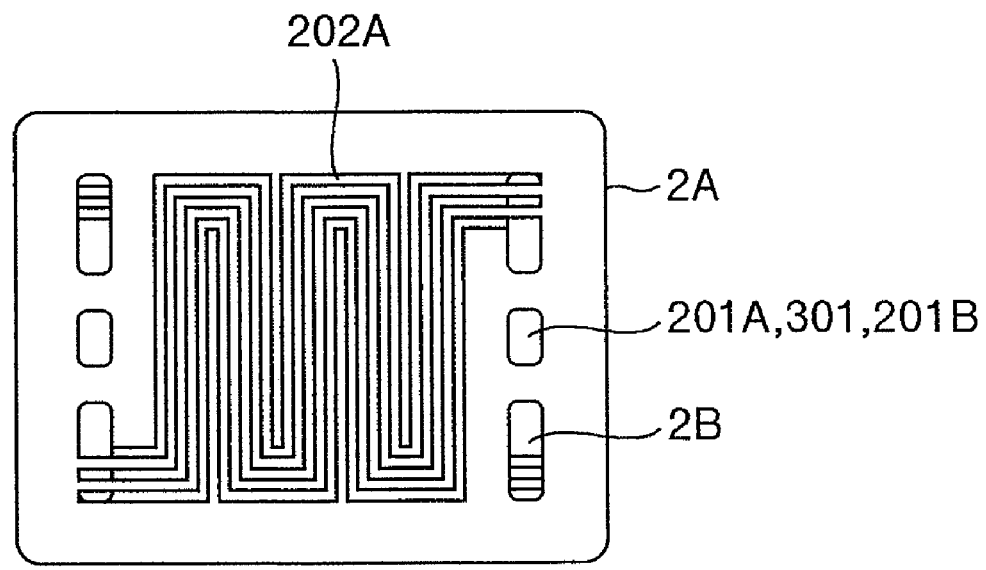
FIG. 2A is a plan view illustrating the separator shown in FIG. 1, in which a covered panel is superposed over its opposite surfaces with passage boards.
Figure 2B:
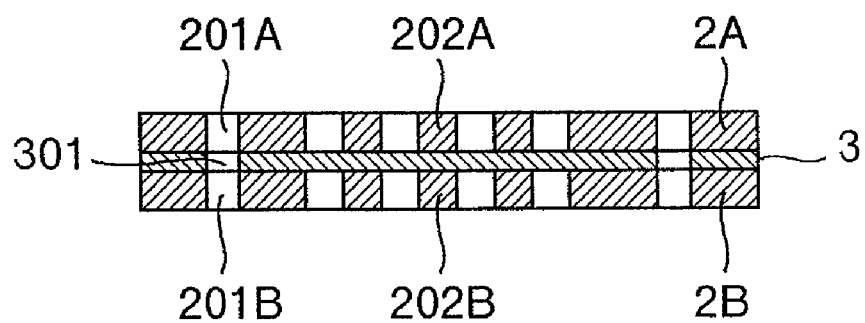
FIG. 2B is a sectional view illustrating the separator shown in FIG. 2A.

Referring to FIGS. 2A and 2B which show the covered metal panel 3 and the passage boards 2A, 2B which are superposed with each other, one upon another, interposing therebetween the covered metal panel 3, that is, FIG. 2A is a top plan view and FIG. 2B is a schematic sectional view, the covered metal panel 3 and the passage board 2A, 2B are arranged so that the manifolds 201A, 201B in the passage boards 2A, 2B can be aligned with the manifolds 301 in the covered metal panel 3 so as to allow the reactive gas and the cooling water to flow therethrough.

With this arrangement, a part or all parts of the channels 202 in the passage boards 2A, 2B is superposed with manifolds 301. The size of the manifolds 301 is greater than that in the passage boards 2A, 2B so as to allow the reactive gas to flow through the manifolds 301 with less resistance, thereby it is possible to reduce pressure loss in the stream of the reactive gas in order to enhance the efficiency of the cell.

The reactive gas exhibits, for example, a steam as shown in FIG. 1. The reaction gas flows through the manifolds 201B and the manifolds 301 and comes into the manifold 201A. Since the channels 202 piercing through the passage board 2A are located in the manifold 201A, a part of the reactive gas branches out in the in-surface direction of the separator 1, and the remainder thereof advances straightforward as it is. The reactive gas which flows in the in-surface direction travels along the channels 202A, and flows in to the manifolds on opposite sides so as to merges together.

With this configuration, the passage board 2 can be formed with a passage part from a single plate. Further, the covered metal panel 32 and the passage board 2 can be both fabricated by stamping, thereby it is possible to reduce the fabricating costs.

Figure 3A:
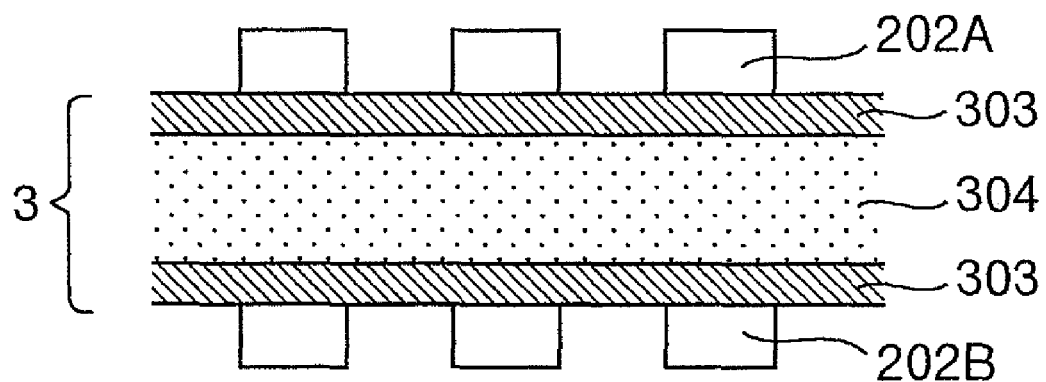
FIG. 3A is a sectional view illustrating the covered metal panel は in an example of the separator.
Figure 3B:
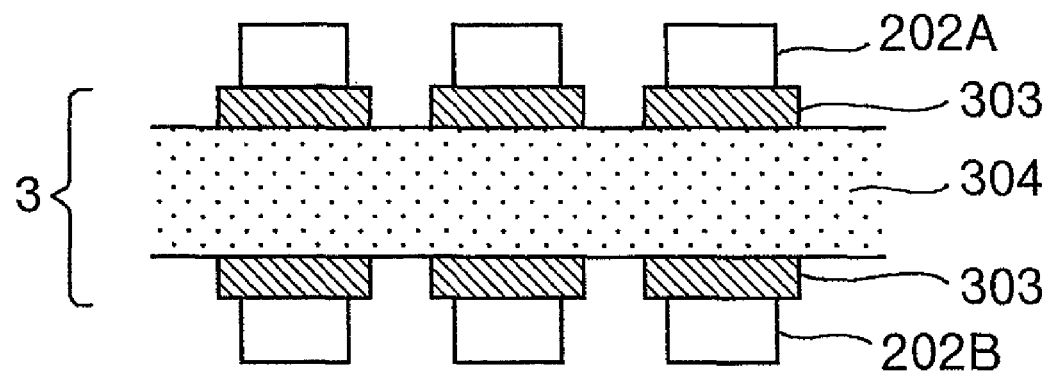
FIG. 3B is a sectional view illustrating another example of the covered metal panel.

Referring to FIGS. 3A and 3B which are sectional views illustrating the covered metal panel 3, in which FIG. 3A shows such a case that a base panel 304 is coated over its entire surface with a covering layer 3, there is obtained such a technical effect that corrosion of the base panel 304 and a growth of a nonconductive film can be restrained with the provision of the covering layer.

With the provision of the above-mentioned configuration, it is possible to provide a separator having a low cost and a long use life can be obtained.

After several basic power generation tests were conduced, there have been found that a metal separator is corroded particularly in a zone where current runs. That is, the interfaces through which the passage channels 202A, 202B of the passage boards 2A, 2B make contact with the covered metal panel 3, as shown in FIG. 3A, are seriously corroded. Since no corrosion was found in the remaining zone, the covering layer 303 may be formed only in a zone where the metal panel 3 makes contact with the passage channels 202, as shown in FIG. 3B.

Figure 4:
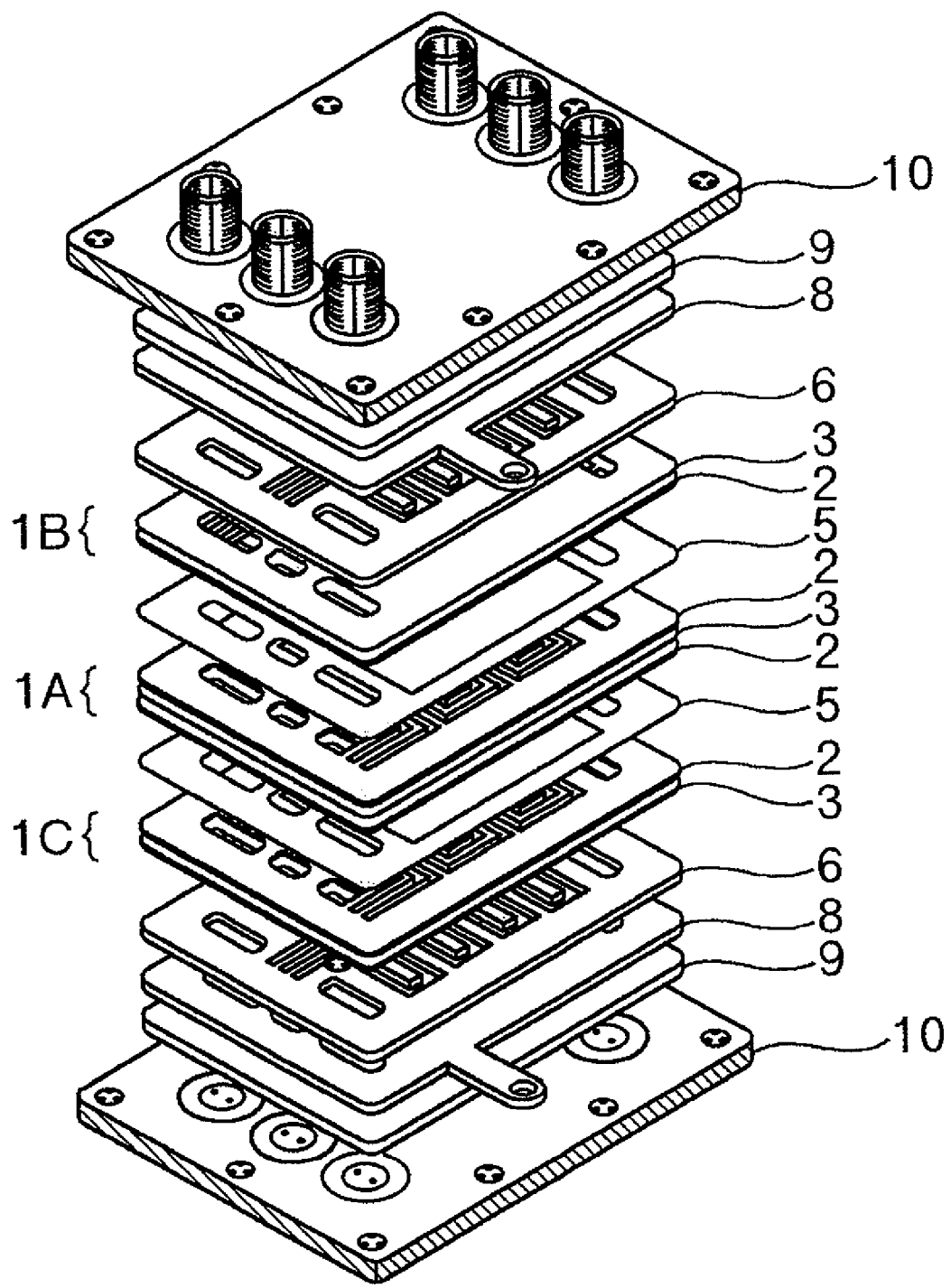
FIG. 4 is an exploded perspective illustrating a configuration of a fuel cell in which the separator is used.

Next, referring to FIG. 4 which shows an example of a fuel cell including two cells with the use of the above-mentioned separators, a separator 1A is the same as that shown in FIG. 1. Separators 1B and 1C have such a configuration that a cooling water passage boards 6 is provided, instead of the above-mentioned passage board 2 in order to pass cooling water through one side surface thereof. An integral MEA 5 is composed of an MEA, a gas diffusion layer and a seal member (gasket) provided along the outer peripheral side of the gas diffusion layer. With the combination of the separators 1A, 1B and with the combination of the separators 1A, 1C, the integral MEA (Membrane Electrode Assembly) 5 is held therebetween so as to constitute a single power generation cell (power generation unit). The cooling water passage boards 6 are interposed between the separator 1B and a power collection panel 8 and between the separator 1C and a power collection panel 8 on opposite sides of the two power generation cells so as to constitute cooling cells.

Since no MEA and the like are required in the cooling water cells, the covered metal panel 3, the cooling water passage panel 6 and the collector panel 8 are stacked one upon another in the mentioned order in the cooling cell. Further, the insulation panel 9 and an end plate 10 are arranged on each of opposite sides thereof, and by fastening the end plates 10 with the use of fastening bolts or the like, the fuel cell having two cells is completed.

Figure 12:
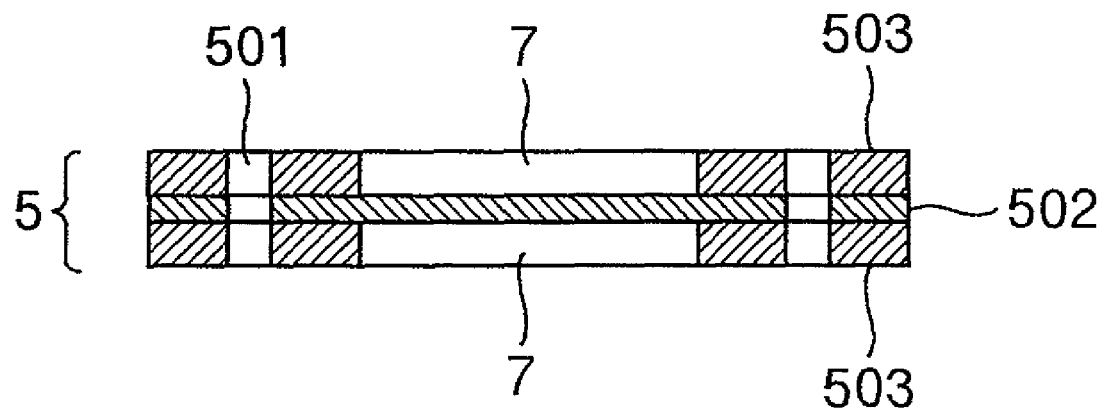
FIG. 12 is a sectional view illustrating an integral MEA.

Referring to FIG. 12 is a sectional view illustrating the integral MEA 5 which is used in this embodiment and as well in other embodiments which will be explained hereinbelow, gas diffusion layers 7 are arranged at opposite surfaces of an MEA 502, and further, gaskets 503 are joined to the outer peripheral parts of the gas diffusion layers so as to cover manifolds 501. Thus, the MEA 502, the gaskets 503 and the gas diffusion layers 7 which have conventionally been separated from each other, can be integrally incorporated with one another, thereby it is possible to enhance the workability of assembling the fuel cell. It should be noted that an MEA whose components are separated from one another as in the conventional one may also be used with no problem even though the integral MEA 5 is used in each of the several embodiments of the present invention.

Since the passage channels are rectangular in the separator according to the present invention, not only the contact resistance between components in the separator but also the contact resistance between the separator and the gas diffusion layer are never increased. On the contrary, in the case of press-forming the separator from a metal sheet, apex parts of the channels through which current runs possibly have curvatures, and as a result, the contact area of the separator and the gas diffusion layer is decreased. However, according to the present invention, the contact area between the separator and the passage channels 202 can be increased, thereby it is possible to decrease the contact resistance.

Embodiment 2

Figure 5:
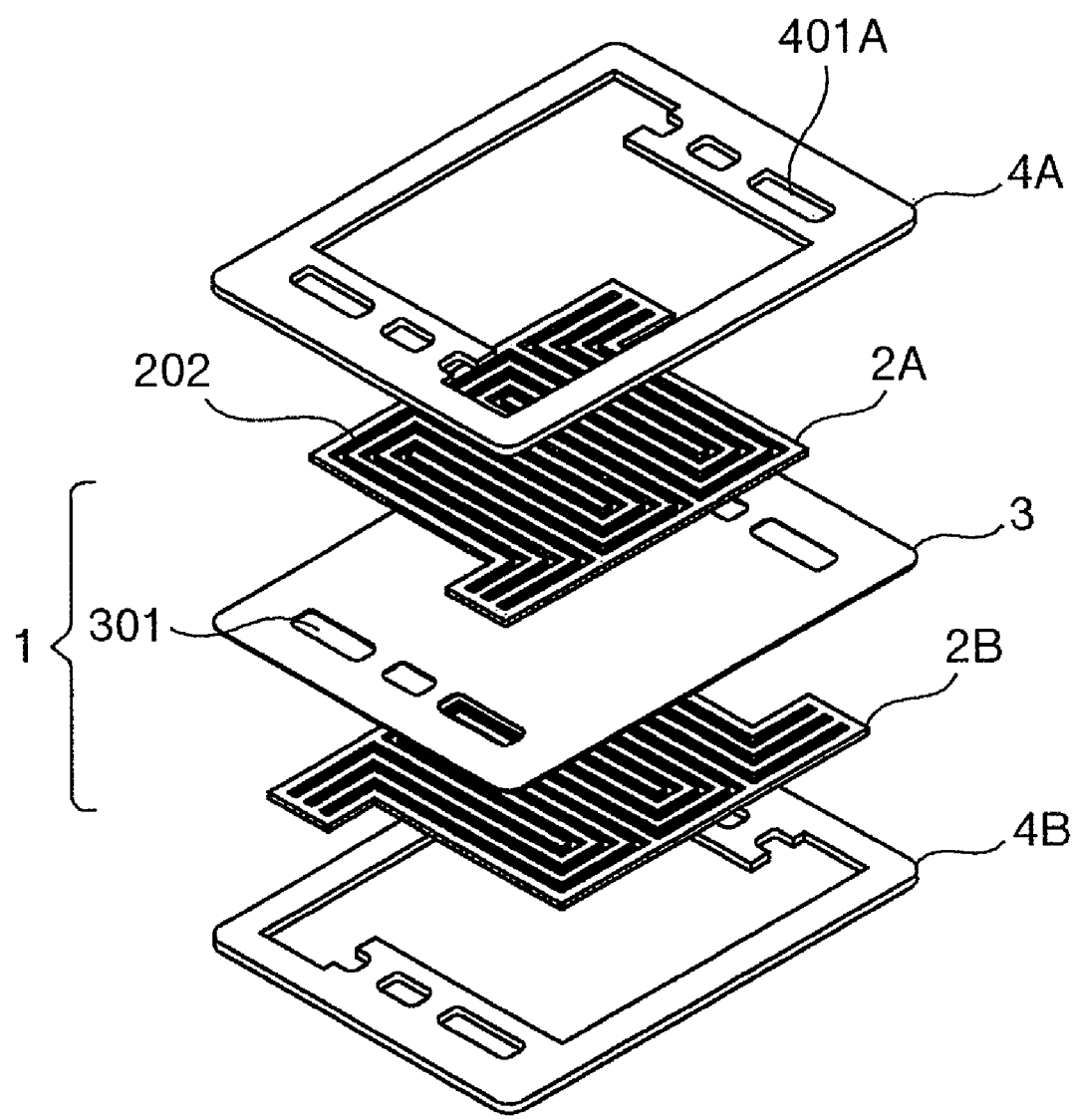
FIG. 5 is an exploded perspective view illustrating an embodiment 2 of a separator in which porous passage boards are used.

Explanation will be hereinbelow made of an embodiment 2 of the present invention with reference to FIG. 5. In this embodiment, the passage boards 2 are made of conductive porous materials. If the passage boards 2 are made of porous material, the quantity of gas fed to the electrode by way of the passage board can be increased, and accordingly, there can be offered such an advantaged that the power generation voltage and the diffusion limit current can be enhanced. Referring to FIG. 5 which shows the separator 1 using the porous passage boards 2, since the passage boards 2 are made of porous materials, the reactive gas can flow though the porous materials, smoothly. Thus, the single passage board 2 as stated in the embodiment 1 cannot be used.

In this embodiment, by arranging the gaskets 4 around the passage boards 2, it is possible to restrain occurrence of cross-leakage of reaction gas from the anode to the cathode or from the cathode to the anode, leakage between the cooling cell and the power generation cell and leakage outside of the fuel cell body.

The passage boards 2A, 2B are arranged at opposite surfaces of the covered metal panel 3 shown in FIG. 5. The covered metal panel 3 is formed thereon a layer which is conductive and anti-corrosive, and is formed therein with manifolds 301 through which reactive gas and cooling medium flow. Similar to the passage boards 2 stated in the embodiment 1, each of the passage boards 2A, 2B is formed therein with a plurality of meandering through-channels for passing the reactive gas and cooling medium therethrough. The passage boards 2A, 2B are in part superposed with the manifolds 301 in the covered metal panel 3. Further, the gaskets 4A, 4B are arranged, having cutouts so as to prevent the passage boards 2 from being superposed therewith, and accordingly, a set of the separators is obtained.

Figure 6A:
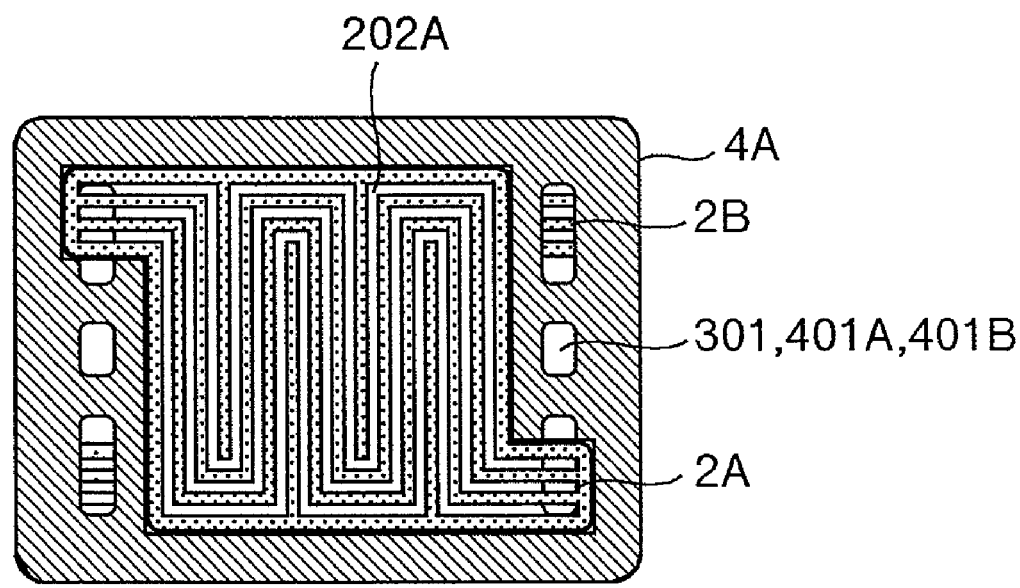
FIG. 6A is a plan view illustrating a separator in which a covered metal panel is superposed over its opposite surface with passage boards.
Figure 6B:
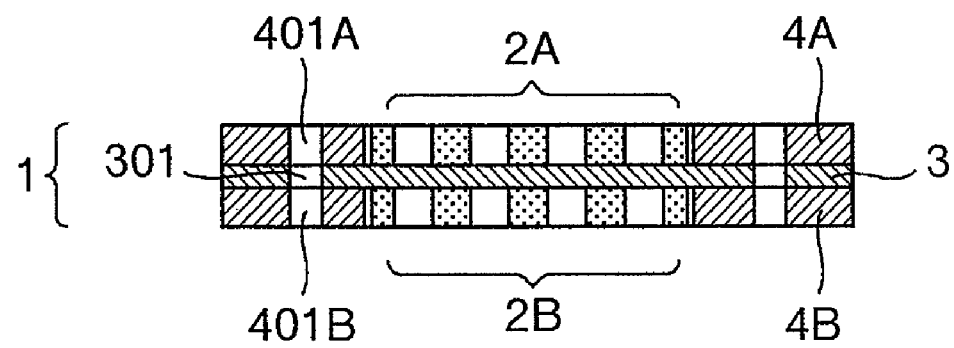
FIG. 6B is a sectional view illustrating the separator shown in FIG. 6A.

Referring to FIGS. 6A and 6B which show such a configuration that the gaskets 4 and the passage boards 2 are superposed one upon another, interposing therebetween the covered metal panel 3, FIG. 6a being a top plane view while FIG. 6b is a schematic sectional view, the metal panel 3 has the same configuration as that explained in the embodiment 1, as shown in FIG. 3A. Instead of the separator 1 in the embodiment 1 as shown in FIG. 4, the fuel cell may also use therein the separator 1 explained in this embodiment.

Embodiment 3

Figure 7:
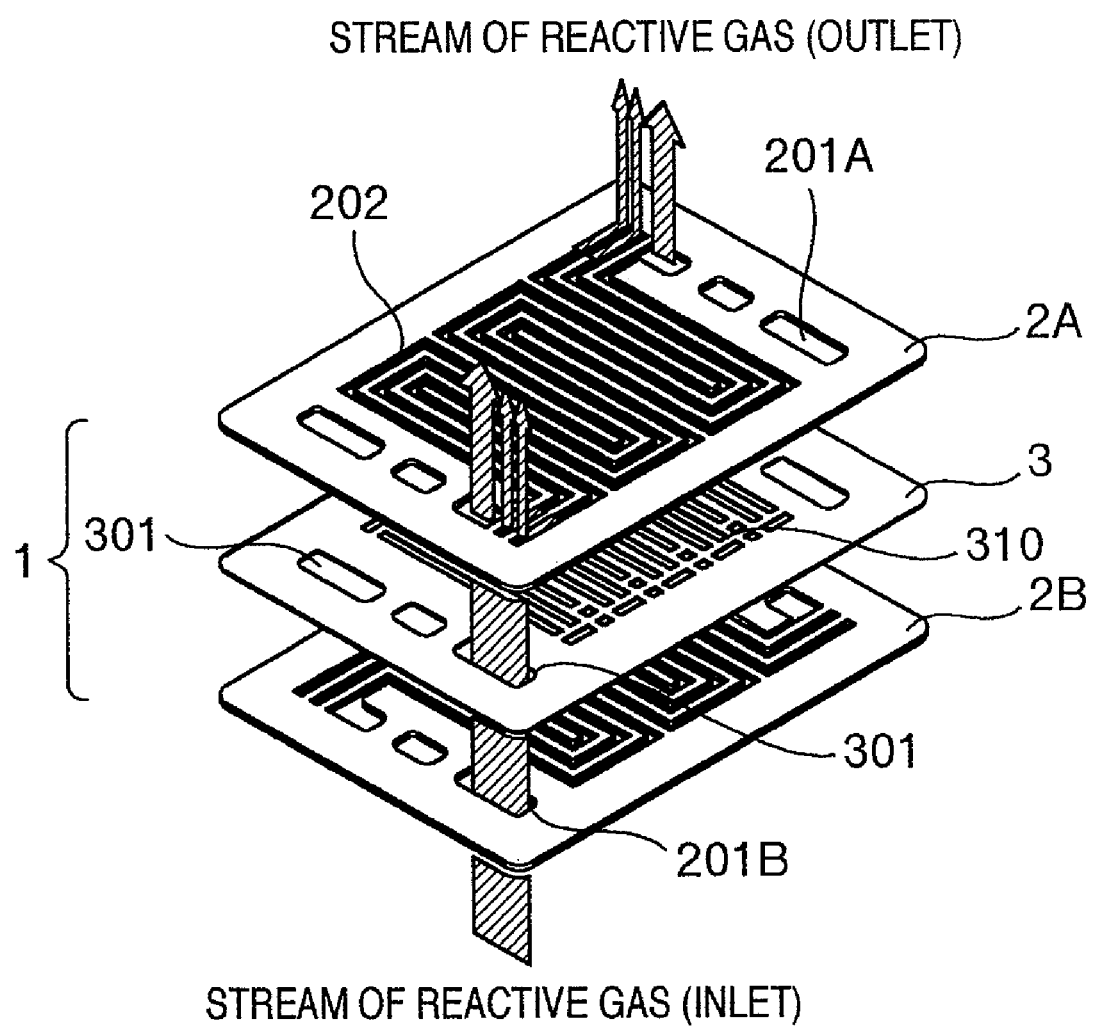
FIG. 7 is an exploded perspective view illustrating an embodiment 3 of a separator in which a covered metal panel formed therein with slits is used.
Figure 8:
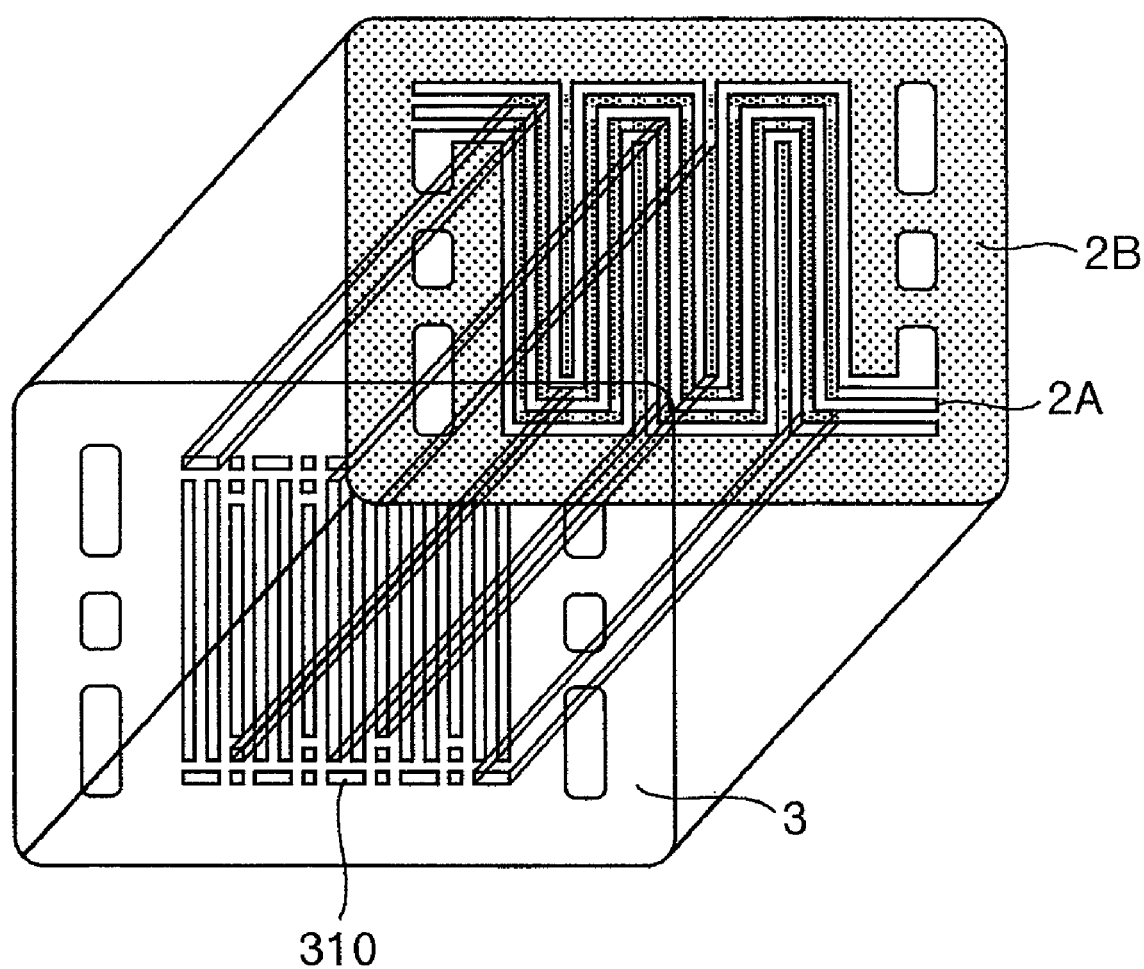
FIG. 8 is a perspective view for explaining a positional relationship between the slits in the covered metal plane and the passage boards.

Explanation will be hereinbelow made of an embodiment 3 with reference the accompanying drawings. In this embodiment, the covered metal panel 3 as used in the embodiment 1 or 2 is formed therein with slits 310 in a part corresponding to an electrode (the passage channels part of the passage board 2). Referring to FIG. 7 which shows a separator 1 having the covered metal panel 3 formed therein with the slits 310, the basic configuration of the separator in this embodiment is the same as that in the embodiment 1 shown in FIG. 1, except the covered metal panel 3. The part of the covered metal panel 3 in which the slits 310 are formed is a zone where the portions of the channel defining walls corresponding to the electrode in the passage boards 2A, 2B which are mated with each another are superposed with each other. This configuration is shown in FIG. 8.

Figure 9A:
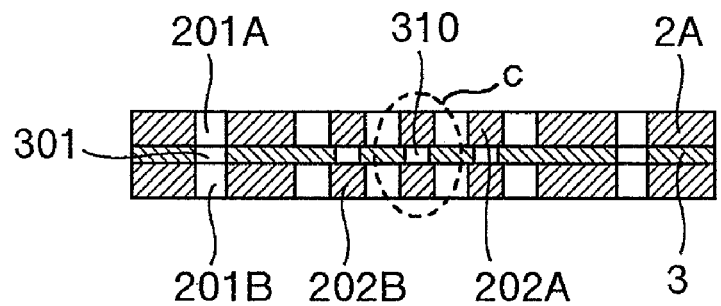
FIG. 9A is a sectional view illustrating the separator in the embodiment 3.
Figure 9B:
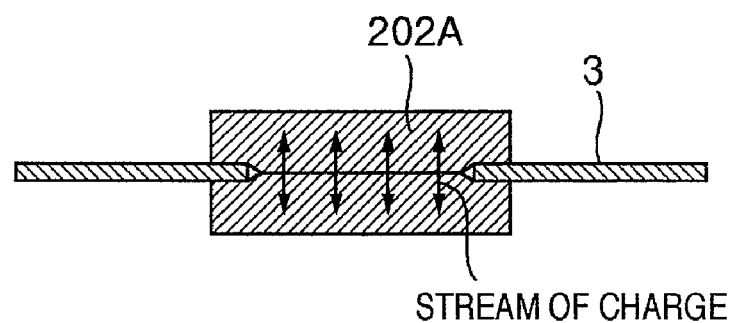
FIG. 9B is an enlarged sectional view illustrating a part of the separator surrounded by a chain line c.
Figure 9C:
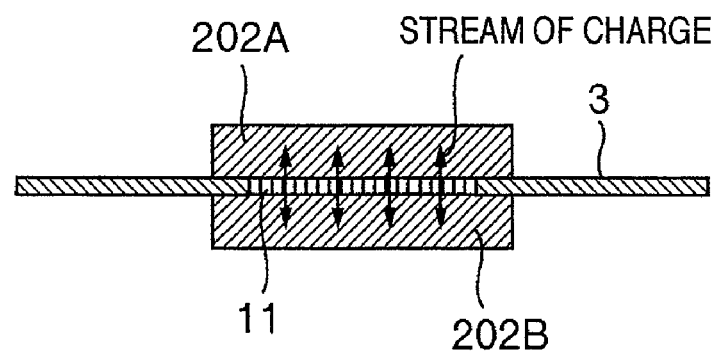

The two passage boards 2A, 2B which are superposed with each other are shown in the upper right part of the figure while the covered metal panel 3 formed therein with the slit 310 is shown in the lower left part thereof. FIG. 8 is prepared for the sake of convenience for an explanation purpose while FIG. 7 shows the actual configuration so as to exhibit the positional relationship. In the upper right part of FIG. 8 in which the two passage boards 2A, 2B are superposed with each other, the passage board 2A is depicted with the solid line while the passage board 2B is depicted by hatching. The parts in which the passage boards 2A, 28 are superposed with each other through the portions of the channel defining walls is exhibited by dark hatching. The part of the covered metal panel 3 in which the slits 310 are formed is those corresponding to the dark hatching. Some of the corresponding parts are exhibited by the broken lines. The size of the slits 310 formed in the covered metal panel 3 is smaller than that of the dark hatching parts so as to prevent the portions of the channel defining walls of the passage boards 2 from being depressed into the slit 310 when these components are stacked one upon another. Referring to FIGS. 9A, 9B and 9c are sectional views illustrating this situation, frankly speaking, the area where current runs is very small in this situation, resulting in voltage drop of the cell. However, by selecting a material having low elastic modulus, such as carbon sheet or carbon paper for the passage boards 2, the portions of the channel defining walls are collapsed, as shown in an enlarged view illustrating the slit 310 part, when the components are stacked so as to form a cell, the electrical conduction can be obtained between the passage board 2A and the passage board 2B. Thereby it is possible to exhibit such technical effects that no covered metal panel 3 is present in the running direction of current, and accordingly, the covering layer 301 for corrosion control is not always necessary for the covered metal panel 3. Should a poor anticorrosion metal such as aluminum be selected as the material of the covered metal panel 3 while carbon is selected as the material of the passage boards 2, a growth of a film of aluminum oxide or hydroxide would be possibly caused during power generation for a long time even with provision of the covering layers in the separator explained in the embodiment 1 or 2, resulting in higher cell resistance. Thus, the performance of power generation would be deteriorated. However, with the provision of the measures explained in this embodiment, no covered metal panel 3 is present in the running path of current, and accordingly, less affection upon the performance of the cell is caused even though the aluminum is oxidized.

In the case of the covered metal panel 3 made of stiff materials such as metal, the passage boards 2A, 2B are sometime not deformed so that no electric conduction cannot be obtained. In this case, by filling a conductive filler 11 such as conductive paint in the slits 310, the electrical conduction can be obtained.

By using the covered metal panel 3 with the slits 310 stated in this embodiment, instead of the coated metal panel 3 in the separator stated in the embodiment 1 or the embodiment 2, a similar fuel cell can be constituted.

In addition, it is not always necessary that the covered metal panel 3 is made of metal. Resin or ceramics having a strength, heat-resistance, water-proof and the like which are sufficient may be used since the passage boards which confront each other with the covered metal panel 3 being held therebetween are electrically connected with each other, direct to each other.

Embodiment 4

In this embodiment, comparison of performances of five types of fuel cells is exemplified in table 1. The first to third fuel cells correspond to those explained in the embodiments 1 to 3 while the fourth fuel cell is of such a type that the embodiments 2 and 3 are combined. The fifth fuel cell is for comparison, in which a separator formed by press-forming a metal sheet is used. The separator 1 in the first fuel cell in the embodiment 1 is composed of the covered metal panel 3 and the two passage boards 2 while the separator 1 in the second fuel cell is composed of the covered metal panel 3 and the two porous passage boards 2 and the two gaskets, and the separator 1 in the third fuel cell is composed of the covered metal panel 3 formed therein with the slits 310. The separator 1 in the forth fuel cell is in the combination of the embodiment 1 and the embodiment 2, and in the passage boards 2 are made of porous materials while the covered metal panel 3 is formed therein with the slits 310.

Any of the fuel cells mentioned above, had an electrode area of 10 cm$^2$, 2 mm pitches of passage channels and ribs in the cathode and the anode, and a depth of channels of 0.4 mm. The thickness and the material of the metal part of the separator 1 were 0.1 mm and stainless steel (JIS Standard SUS304), respectively. Barr or the like which was caused when the base board 304 was fabricated, were removed by polishing.

The covering layer 303 was formed over the entire surface of this metal. The covering layer 303 was formed in such a way that a conductive material which was a mixture of graphite and carbon black was coated thereover with conductive paint having PVDF (poly vinylidene di-fluoride) as a binder and NPM (N-methyl-2-pyrrolidene) as a solvent by dipping, and was then vacuum-dried at a temperature of about 150 deg. C. for 30 minutes. The concentration of the solvent was adjusted so that the thickness of the film of the conductive paint after finishing was 20 μm. The same kinds of MEAs were used for all fuel cells, having the gas diffusion layer 7 and the gasket 4 which were commercially available and which were integrally incorporated with each other.

In the fifth fuel cell, the separator was press-formed so that its peripheral part was flat while the passage channel parts facing the electrode surfaces were rectilinear so that the reactive gas was distributed over the opposite surface of the singe separator 1. A frame made of PPS (poly Phenylene Sulfide) was applied so as to fill a gap formed between the integral MEA 5 and the periphery of the separator 1 when the separator 1 and the integral MEA 5 were superposed with each other.

The passage boards 2 in the first and third fuel cells was formed of an expanded graphite sheet having a thickness of 0.4 mm, which was punched out by a Thomson type punching machine so as to form passage channels 202 and the manifolds 201. In the second and forth fuel cells, carbon paper having a thickness of about 0.4 mm and subjected to a water repellant process was punched out by the Thompson type punching machine so as to form the passage channels 202 and the manifolds 201, thus, the passage boards 2 was prepared. The covered metal panels 3 used in the second and fourth fuel cells were formed therein with slits 310 having a size which was smaller than a size of an overlap obtained by stacking the two passage boards 2 facing the covered metal panel 3, by 0.4 mm in both horizontal and vertical directions.

Figure 10:
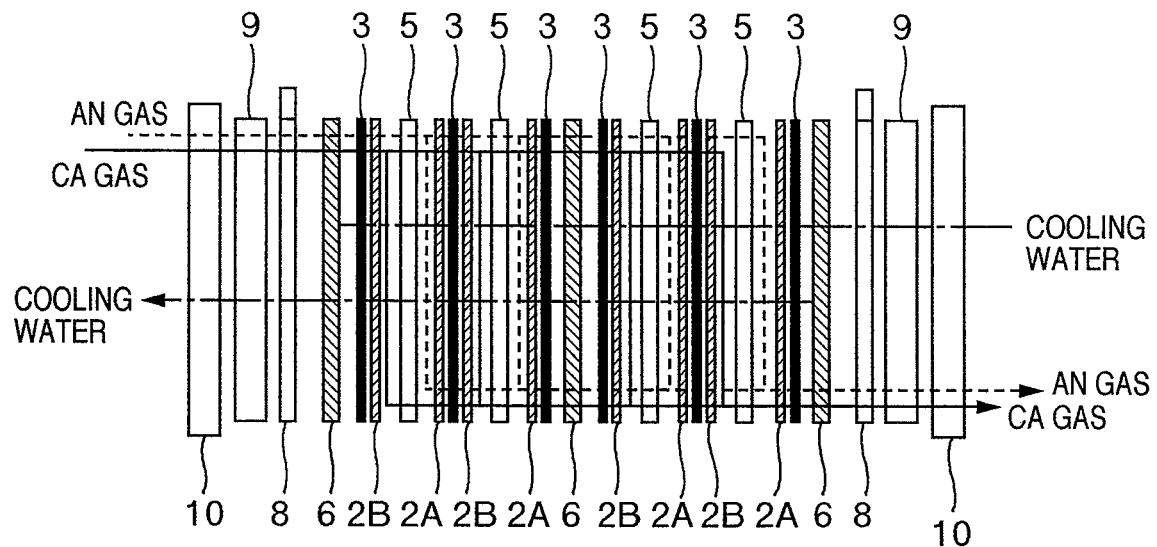
FIG. 10 is an exploded view for explaining the order of superposition of a fuel cell in an embodiment 4.

The above-mentioned components were stacked one upon another so as to obtain a fuel cell having four power generation cells and three cooling cells. The stacking order thereof is schematically shown in FIG. 10. For reference, the streams of reactive gas and cooling water, as an example, are schematically shown by the broken lines.

Power generation tests were carried out under the following conditions: the temperature of cooling water was controlled so as to set the temperature of the cell to an about 70 deg. C. Pure hydrogen was used as fuel gas (AN gas) and the air was used as oxidant gas (CA gas). Humidification was made so as to set the due point at each of inlet ports of the fuel cell to 70 deg. C. The flow rate of gas was controlled so as to set the utilization factors of hydrogen and oxygen respectively to 80% and 40% with respect to a current density.

Averaged cell voltages of the fuel cells at a current density of 0.25 A/cm$^2$ were measured after 50 hour and 1,000 hours of power generation. Further, diffusion limit current values were measured after 50 hours of power generation. The results thereof are shown in Table 1 in which averaged cell voltages (at 2.5 A/cm$^2$) and diffusion limit currents are shown.

TABLE 1

| Fuel Cell | Voltage (V) After 50 h | Voltage (V) After 1,000 h | Diffusion Limit Current (50 h) A/cm$^2$ |
|---|---|---|---|
| First Fuel Cell | 0.73 | 0.68 | 1.5 |
| Second Fuel Cell | 0.75 | 0.71 | 1.8 |
| Third Fuel Cell | 0.74 | 0.72 | 1.5 |
| Fourth Fuel Cell | 0.75 | 0.73 | 1.7 |
| Fifth Fuel Cell | 0.74 | 0.65 | 0.8 |

With reference to Table 1, the first and fourth fuel cells exhibit high averaged voltage after 50 hours of power generation (initial stage). The fourth fuel cell exhibits a highest averaged voltage after 1,000 hours of power generation. The fifth fuel cell exhibits a highest degree of deterioration after 1,000 hours of power generation while the third and fourth fuel cells exhibits a lowest degree of deterioration.

The averaged cell voltage after 50 hours of power generation have a correlation with respect to an A.C resistance of the cell, and the second and fourth fuel cells using carbon paper as the material of the passage boards 2 exhibits a lowest value while the first fuel cell using an expanded graphite sheet as the material of the passage boards 2 exhibits a low averaged cell voltage. The third fuel cell although using the passage boards 2 formed of an expanded graphite sheet exhibits a low resistance of the covered metal panel 3 due to such a configuration the covered metal panel 3 is formed therein with the slits 310 so as to allow the opposed two passage boards to make direct contact with each other. As a result, it can be understood that the averaged cell voltage of the third fuel cell is higher than that of the first fuel cell.

Further, the fourth fuel cell exhibits a highest averaged cell voltage after 1,000 hours of power generation, but exhibits a lowest degree of deterioration. It is considered, due to similar reasons, that the degree of corrosion of the covered metal panel 3 made of SUS304 steel is lowered at maximum since no metal is present in the running path of current. Further, the third fuel cell exhibits less drop in the averaged cell voltage after 1,000 hours of power generation. Thus, the fuel cell (third and fourth fuel cells) in which the slits 310 are formed in the covered metal panel 3 exhibits such a technical effect that deterioration thereof can be minimized.

Meanwhile, the fifth fuel cell (comparison example) exhibits a less averaged cell voltage after 50 hours of power generation, and further exhibits a highest degree of deterioration after 1,000 hours of power generation. Since the separator in the fifth fuel cell was press-formed so that the contact part thereof with the integral MEA 5 has curvature, it may be estimated that it has a higher contact resistance. Although the precise reason why the averaged cell voltage after 1,000 hours of power generation is low has not yet been clarified, it may be considered that the current density is locally increased in the contact part of the separator with the integral MEA 5 since the contact area is small, and accordingly, the progress of corrosion is promoted.

The second or fourth fuel cell using the passage boards 2 made of porous materials exhibits a highest diffusion limit current. Since the passage boards 2 are porous, it is considered that the reactive gas can be fed to the electrodes through the intermediary of the passage boards 2.

However, it is noted that one and the same technical effect cannot be always obtained by any of various measures which are used for the covering layer 303 of the covered metal panel 3. There may be several measures, that is, a PVD process, plating, chemical conversion process and the like, which can be selected in accordance with a material of the base board 304. However, the measures which can exhibit a high degree of conductivity and affective corrosion control are limited. In order to evaluate effective anti-corrosion control, a polarizing curve was measured within a 0.05 M sulfuric aqueous solution at a temperature of 30 deg. C. in order to evaluate the corrosion preventing performance, and as a result, it was found that a highest effective covering layer was the one which was coated thereover with conductive paint.

Pin holes or cracks would possibly be caused in the covering layer 303 formed by other measures, and there would not be obtained a sufficient corrosion preventing effect unless a sound covering layer with no pin holes is formed. Among various kinds of conductive paint, the one using a binder selected from a group consisting a fluorine group binder, a phenol group binder, an epoxy group binder, a styrene group binder, a butadiene group binder, a polycarbonate group binder, a polyphenylene sulfide group binder, a mixture thereof and a copolymer thereof exhibits a corrosion preventing effect, and among others, a fluorine group PVDE exhibits a most remarkable corrosion preventing effect.

It is required to select an appropriate material as the conductive material. Paint with ceramic such as tungsten carbide as the conductive material possibly causes a risk of detrimental affection upon the fuel cell, since the covering layer 303 is oxidized during power generation and is accordingly tuned into tungstic acid. On the contrary, paint using a carbon material such as graphite as the conductive material, is electrochemically stable, and has sufficient durability even in a fuel cell environment. The mixture of the carbon black and graphite exhibits such an effect that the electrical conductive can be highly enhanced.

There has been used the base board 304 of the covered metal panel which is made of stainless steel as an example in the embodiments stated thereinabove. The material of the base board 304 should not be limited to stainless steel, but there may be used any material if it has a certain degree of corrosion resistance. As to various metal materials, polarizing curves and degrees of corrosion by a dipping test were measured within a 0.05 M sulphuric aqueous solution or a 0.05 M sodium sulfate aqueous solution at a temperature of 30 deg. C., and as a result, in addition to the stainless steel, it has been found that nickel, nickel base alloy, titanium, titanium base alloy, niobium, niobium base alloy, tantalum, tantalum base alloy, zirconium, zirconium base alloy exhibit in particular, an excellent corrosion resistance.

Almost all above-mentioned metals exhibit less emission of corrosion products, and the degree of affection upon an electrolyte or an electrode is very small. Accordingly, it is preferable to constitute the base board 304 with the above-mentioned metals.

However, it is not always required that the base board 304 is monolithic, but at least outer surface of the base board 304 may be formed of the above-mentioned metal. For example, the base board 304 having an electrode layer, in which the above-mentioned metal is formed by measures such as cladding, may be used.

Meanwhile, it has been found that aluminum or aluminum alloy is anticorrosive in a neutral solution even though it is corroded in sulfuric acid. Thus, in a fuel cell using the covered metal panel formed therein with the slits 310, even though the covered metal panel 3 made of aluminum was used, since less current runs through the aluminum, the degree of corrosion was low. This is because no aluminum is present in the running path of current. Thus, the resistance of the fuel cell is not increased even though the aluminum is corroded. A film similar to almite grows on aluminum in the fuel cell environment, and accordingly, it may be considered as a factor that the film can restrain corrosion. For example, even though the corrosion product of the aluminum is discharged from the base board 304, the affection upon the electrodes and the electrolyte film is less, and in view of this point, it has been found that aluminum is effective. It has been found that iron, low alloy steel or copper are inappropriate since a stable nonconductive film cannot be formed under the fuel cell environment.

The covered metal panel 3 and the passage boards 2 can constitute a fuel cell without such a measure as adhesive in any of the embodiments 1 to 4 as stated above. However, if the machining accuracy or the assembling accuracy of any of the components is insufficient, reactive gas would cause cross-over between the opposite electrodes. In particular, the separator in which the covered metal panel 3 is formed therein with slits 310 (for example, in the third or fourth fuel cell) causes formation of a gap if the position of the passage boards 2 is shifted from the slits, and accordingly, cross-over of the reactive gas would possibly occur.

As countermeasures, it is preferable to bond the covered metal layer 3 and the passage boards 3 with each other beforehand. This method can reduce the number of components during assembly, and accordingly, it is possible to exhibit such an additional effect that the process for assembling a fuel cell can be simplified.

In order to bond the covered metal panel 3 and the passage boards 2 with each other, conductive adhesive or conductive paint may be used. A one side surface of the passage board 2 on which the covered metal board 3 is to be bonded, is coated thereover with the conductive adhesive or the conductive paint by a general purpose coating means such as spraying, screen printing, roll coater or the like. The thus coated surface of the passage board 2 is applied to the covered metal panel 3, and then under the condition with a predetermined pushing pressure and a drying condition, they are dried so as to complete the separator 1.

Figure 11A:
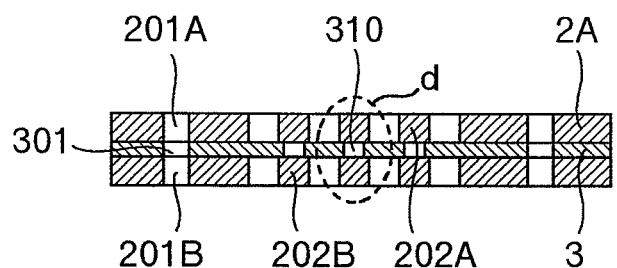
FIG. 11A is a sectional view illustrating a separator in which passage boards are bonded to a covered metal panel with a conductive paint.
Figure 11B:
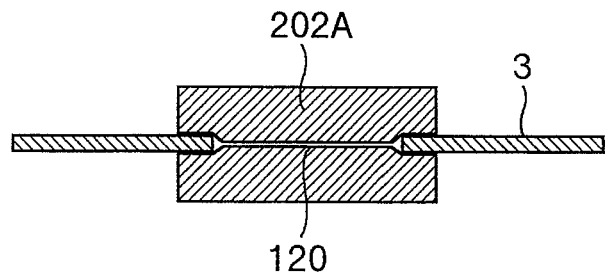
FIG. 11B is an enlarged sectional view illustrating a part surrounded by a dotted line in FIG. 11A.

Referring to FIG. 11 which is a sectional view illustrating the covered metal panel 3 and the passage boards 2 which are bonded together with conductive paint as an example, the covered metal panel 3 and the passage boards 2 are joined by the conductive adhesive (conductive paint) 120 so as to be integrally incorporated with each other, and further, the paint 120 can fill gaps which are present in the interface between the covered metal panel 3 and the passage board 2. Thus, it is possible to enhance the sealing ability, and as well to restrain occurrence of cross-leakage of the reactive gas. In the case of the separator using the covered metal panel 3 with no slits 310, the paint can exhibits such an effect that the passage boards 2 can be secured.

The conductive adhesive (conductive paint) composed of the resin binder and the carbon conductive material as stated above is used, the corrosion preventing function can also be obtained. Thus, it is effective. With this configuration, the base board 304 of the covered metal panel 3 with no covering layer 303 may be bonded thereto with the passage boards 2.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A separator for a fuel cell, comprising a planar panel formed therein with a plurality of manifolds for passing reactive fluid or cooling medium through adjacent cell, and a pair of conductive passage boards superposed with one another, interposing therebetween the planar panel, the passage boards being formed therein with a plurality of meandering through channels for distributing the reactive fluid or the cooling medium from the manifolds, wherein the planar panel is formed therein with slits through which channel defining walls of the meandering through channels of the fluid passages are electrically connected with each other.

2. A separator for fuel cell as set forth in claim 1, wherein the planar metal panel is formed thereover with a covering layer for preventing the planar metal panel from being corroded, and for preventing a growth of a nonconductive film.

3. A separator for a fuel cell as set forth in claim 1, wherein the conductive passage boards are made of a carbon group porous conductive material.

4. A separator for a fuel cell as set forth in claim 1, wherein the metal planar panel has an outermost layer made of a material selected from a group consisting of stainless steel, nickel, nickel base alloy, titanium, titanium base alloy, niobium, niobium base alloy, tantalum, tantalum base allyl, tungsten, tungsten base alloy, zirconium, zirconium base alloy, aluminum and aluminum alloy.

5. A separator for a fuel cell as set forth in claim 2, wherein the covering layer is composed of a binder selected from a group consisting of a fluorine group binder, phenol group binder, an epoxy group binder, a styrene group binder, a butadiene group binder, a polycarbonate group binder, a polyphenylene sulfide group binder, a mixture thereof and a copolymer thereof, and a conductive material containing therein not less than one kind of carbon.

6. A separator for a fuel cell as set forth in claim 2, wherein the covering layer is conductive and anticorrosive, and in integrally incorporated with the passage board.

7. A separator for a fuel cell as set forth in claim 1, wherein the meandering through channels of the passage boards are pressed against the planar metal panel, and accordingly, the channel defining walls of the meandering through channels are deformed so as to be made into direct contact with the each other through the slits.

8. A separator for a fuel cell as set forth in claim 1, wherein the slits in the planar metal panel are filled therein with a conductive filler through which the channel defining walls of the meandering through channels of the passage metal boards are electrically contacted with each other.

* * * * *